United States Patent
Nguyen-Hoang et al.

(10) Patent No.: US 10,421,226 B2
(45) Date of Patent: Sep. 24, 2019

(54) STACK MOLD

(71) Applicant: Husky Injection Molding Systems Ltd., Bolton (CA)

(72) Inventors: Sebastien Sang Nguyen-Hoang, Luxembourg (LU); Jean-Christophe Witz, Yutz (FR); Ralf Walter Fisch, Sarrebourg (DE)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 741 days.

(21) Appl. No.: 14/893,773

(22) PCT Filed: Jun. 2, 2014

(86) PCT No.: PCT/CA2014/050509
§ 371 (c)(1),
(2) Date: Nov. 24, 2015

(87) PCT Pub. No.: WO2015/003259
PCT Pub. Date: Jan. 15, 2015

(65) Prior Publication Data
US 2016/0107359 A1   Apr. 21, 2016

Related U.S. Application Data

(60) Provisional application No. 61/844,049, filed on Jul. 9, 2013.

(51) Int. Cl.
*B29C 45/77* (2006.01)
*B29B 11/08* (2006.01)
(Continued)

(52) U.S. Cl.
CPC .............. *B29C 45/77* (2013.01); *B29B 11/08* (2013.01); *B29C 45/261* (2013.01); *B29C 45/2673* (2013.01); *B29C 45/78* (2013.01); *B29C 45/76* (2013.01); *B29C 49/06* (2013.01); *B29C 2945/76006* (2013.01);
(Continued)

(58) Field of Classification Search
CPC .......... B29C 45/77; B29C 2945/76006; B29C 2945/76257; B29C 2945/76267
See application file for complete search history.

(56) References Cited

U.S. PATENT DOCUMENTS 3,807,914 A   4/1974 Paulson et al.
5,176,859 A   1/1993 Leffew
(Continued)

FOREIGN PATENT DOCUMENTS

EP   1447200 A2   8/2004
JP   S6163428 A   4/1986
(Continued)

OTHER PUBLICATIONS

Extended European Search Report; dated Jul. 19, 2017, 10 pages.
(Continued)

*Primary Examiner* — Benjamin A Schiffman

(57) ABSTRACT

There is provided a mold stack (100). The mold stack (100) comprises a core insert assembly (102), the core insert assembly (102) for defining an inner portion of a molded article to be molded. The core insert assembly (102) includes a sensor assembly (120) configured to measure the in-mold pressure using entire active surface of the core insert assembly (102).

5 Claims, 2 Drawing Sheets

(51) Int. Cl.
  *B29C 45/26* (2006.01)
  *B29C 45/78* (2006.01)
  *B29C 45/76* (2006.01)
  *B29K 105/00* (2006.01)
  *B29C 49/06* (2006.01)
  *B29K 67/00* (2006.01)

(52) U.S. Cl.
  CPC ............... *B29C 2945/7626* (2013.01); *B29C 2945/76257* (2013.01); *B29C 2945/76267* (2013.01); *B29C 2945/76284* (2013.01); *B29C 2945/76381* (2013.01); *B29C 2945/76454* (2013.01); *B29C 2945/76481* (2013.01); *B29C 2945/76498* (2013.01); *B29C 2945/76531* (2013.01); *B29C 2945/76755* (2013.01); *B29K 2067/003* (2013.01); *B29K 2105/258* (2013.01)

(56) References Cited

U.S. PATENT DOCUMENTS

| | | |
|---|---|---|
| 5,472,331 A | 12/1995 | Watkins |
| 5,846,573 A | 12/1998 | Wurst et al. |
| 5,972,256 A | 10/1999 | Wurst et al. |
| 6,129,536 A | 10/2000 | Beck |
| 7,258,536 B2 | 8/2007 | Olaru et al. |
| 2004/0142057 A1 | 7/2004 | Kao et al. |
| 2005/0236725 A1 | 10/2005 | Niewels et al. |
| 2005/0236740 A1 | 10/2005 | Niewels |
| 2008/0085334 A1 | 4/2008 | Barnett |
| 2009/0022844 A1 | 1/2009 | Mai et al. |
| 2012/0217668 A1 | 8/2012 | Catoen et al. |

FOREIGN PATENT DOCUMENTS

| | | |
|---|---|---|
| JP | H0890622 A | 4/1996 |
| KR | 20070099758 A | 10/2007 |
| KR | 20130053808 A | 5/2013 |
| WO | 2008043168 A1 | 4/2008 |

OTHER PUBLICATIONS

PCT International Search Report, Zhang, Pengfei, 3 pages, dated Jul. 18, 2014.
European Search Report, Raichler, Gerald, dated May 2, 2018, 10 pages.
Partial European Search Report, Gemeinböck Gerald, 6 pages, dated Feb. 16, 2017.

STACK MOLD

FIELD OF THE INVENTION

The present invention relates, generally, to injection molding systems. More particularly, the invention relates to a mold stack.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes an injection unit, a clamp assembly and a mold assembly. The injection unit can be of a reciprocating screw type or of a two-stage type. The clamp assembly includes inter alia a frame, a movable platen, a fixed platen and an actuator for moving the movable platen and to apply tonnage to the mold assembly arranged between the platens. The mold assembly includes inter alia a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as neck rings, neck ring slides, ejector structures, wear pads, etc.

As an illustration, injection molding of PET material involves heating the PET material (ex. PET pellets, PEN powder, PLA, etc.) to a homogeneous molten state and injecting, under pressure, the so-melted PET material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

An injection mold for making preforms (and other molded articles) typically includes one or more molding cavities for receiving molten resin and forming the preforms. To increase the flexibility of the molding assembly, interchangeable inserts can be inserted into bores in a cavity plate. FIG. 1 shows a portion of a prior art injection molding machine 10. One or more mold cavities 12 are usually defined between complementary shaped, generally cylindrical cavity inserts 14 and core inserts 15 that are arranged within bores (not separately numbered) defined in a cavity plate 16. The mold cavities 12 are aligned generally parallel to the direction of mold-clamping action (i.e., the mold-clamping axis).

For molded articles that have threaded neck portions, a split neck ring (not shown) cooperates with the core insert 15 to create the neck. A taper is typically provided at an end of the cavity insert 14 (also not shown) to help align the neck ring.

A hot runner assembly 18 communicates a flow of molten resin to melt channels 19 in one or more nozzle assemblies 20. A gate insert 22 is seated within the mold cavity inserts 14. A first profiled surface 24 on the gate insert 22 defines a receptacle to house the tip of the nozzle assembly 20. A second profiled surface 26 on the gate insert 22 defines a portion of the mold cavity 12. A gate 28 is provided in the gate insert 22 which provides fluid communication between each of the nozzle assemblies 20 and each of the mold cavities 12. Gate 28 is open or closed by a valve pin 29. Other types of gating, such as slide valves or thermal gating can also be used.

The molten resin that is injected into the cavities must be cooled to solidify the resin so that the molded preform can be removed from the mold cavity 12. It is desirable to cool the preform as quickly as possible so the preforms can be removed and a next injection cycle initiated with minimal time delay. To this effect, cooling channels 30 are typically provided in the cavity inserts 14 and gate inserts 22. A cooling fluid, such as water, is circulated through the cooling channels 30.

U.S. Pat. No. 5,472,331 teaches a core pin 14, which serves as a force transducer to detect pressure in the mold cavity. This is achieved by means of a strain gauge bridge 50. The strain gauge measures the elastic deformation of the pin resulting from the compensating force placed on the core pin during pressurization of the molding cavity.

US patent publication 2005/0236725 teaches a core 153 with an annular channel 160 in which an annular shaped piezoceramic insert 161 is positioned. The sensor can be used to sense pressure within the mold.

U.S. Pat. No. 5,972,256 teaches a core pin 10 with a core tip 22. The core pin 10 further includes strain gauges for measuring in mold pressure. When the molten material enters the cavity, the molten material pushes axially on the core pin 22. The strain gauges respond linearly to the applied force of the plastic entering the cavity. The information sensed can be used to accurately control the injection process.

U.S. patent application 2008/0085334 teaches a plug placeable in a hot runner manifold, the plug having sensing element. Responsive to the pressure sensed by the plug, the temperature of the heaters or pressure of the melt can be adjusted (see paragraph 0035).

U.S. Pat. No. 7,258,536 teaches various sensors, including a pressure sensor, and responsive to the reading from the sensors, controlling processing parameters, including heaters.

U.S. Pat. No. 5,176,859 teaches pressure transducers to measure in-mold cavity pressure and responsive to the measurement to control the clamp force.

U.S. Pat. No. 3,807,914 teaches sensing means mounted in the mold to measure molding cavity pressure—as the resin flows in the molding cavity, the resin engages the end of the ejector pin and applies pressure thereagainst. This pressure reflects the pressure of the resin present in the molding cavity. The ejector pin moves in response to the pressure and the movement is sensed to obtain the reading of the pressure of the resin in the molding cavity. Responsive to this reading, control algorithm controls heating means to maintain the pressure of the resin in the mold cavity at a pre-determined level.

U.S. patent application 2004/0142057 teaches using sensors to measure pressure in the cavity and a control unit that control a piezoelectric actuator to control/adjust cavity pressure.

SUMMARY

According to a first broad aspect of the present invention, there is provided a mold stack. The mold stack comprises a core insert assembly, the core insert assembly for defining an inner portion of a molded article to be molded. The core insert assembly includes a sensor assembly configured to measure the in-mold pressure using entire active surface of the core insert assembly.

According to another broad aspect of the present invention, there is provided a mold stack. The mold stack comprises a core insert assembly. The core insert assembly is for defining an inner portion of a molded article to be molded. The core insert assembly includes a core inner part member and a core insert, the core insert for defining a portion of a molded article and the core inner part member for attachment to a core plate. The core inner part member and the core insert ate coupled via a threaded connection.

According to yet another broad aspect of the present invention, there is provided a method of operating a molding apparatus having a plurality of molding cavities. The method comprises measuring a pressure profile for a first molding cavity and a second molding cavity; comparing the pressure profiles; adjusting an operational parameter of the molding apparatus to obtain the same pressure profile within all of the molding cavities.

DETAILED DESCRIPTION OF DRAWINGS

DETAILED DESCRIPTION OF THE EMBODIMENTS

Figure 2:
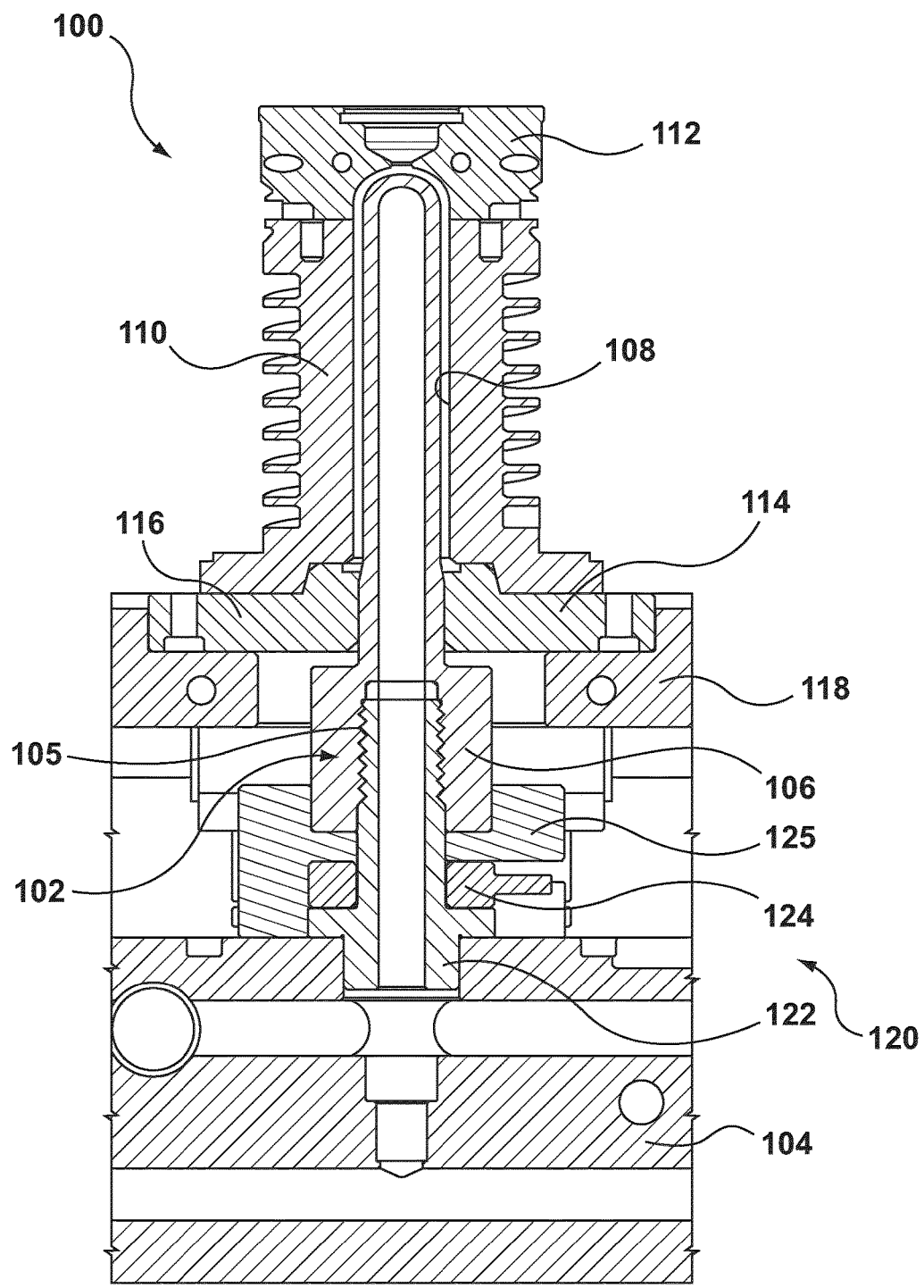
FIG. 2 shows a cross section view taken along an operational axis of a mold stack implemented in accordance with embodiments of the present invention.

With reference to FIG. 2, there is depicted a portion of a mold stack 100 according to a non-limiting embodiment of the present invention. The mold stack 100 comprises a core insert assembly 102, in use, associated with a core plate 104. Within the depicted embodiments, the core insert assembly 102 comprises a core insert 106. Generally speaking, the purpose of the core insert 106 is to define a portion of a molding cavity 108 and, more specifically, an inner surface of a preform (not depicted) to be formed within the molding cavity 108. Other components of the core insert assembly 102 will be described momentarily.

There is also provided a cavity insert 110 positionable in use within a bore (not depicted) defined within cavity plate (not depicted). Generally speaking, the purpose of the cavity insert 110 is to define a portion of the molding cavity 108 and, more specifically, a portion of an outer surface of a body portion of a preform (not depicted) to be formed within the molding cavity 108. Within the specific illustration of FIG. 2, there is also provided a gate insert 112. The gate insert 112 provides (i) an interface (not separately numbered) with a hot runner nozzle (not depicted) and (ii) an interface (not depicted, but also known as a "gate") for the flow of plastic material between the hot runner nozzle (not depicted) and the molding cavity 108.

Within the illustration of FIG. 2, there is provided a split mold insert 114, also referred sometimes to by those of skill in the art as a "neck ring" or a stripper ring. Two split mold inserts 116 form a split mold insert pair. The function of the split mold inserts 114 is well known to those of skill in the art and, as such, need not be discussed here at any length. However, generally speaking, the split mold inserts 114 perform two functions: (a) to form certain portions of the molded article to be molded in the molding cavity 108 and (b) to assist in stripping of the molded article off the core insert 106. To that extent, each of the mold inserts 116 of the split mold inserts 114 are coupled to a respective slide 118 for actuation therewith—both in an axial and transverse direction vis-à-vis operational axis of the molding stack 100.

Within the non-limiting illustration of FIG. 2, the core insert assembly 102, the cavity insert 110, the gate insert 112 and the split mold inserts 114 are depicted in a so-called "mold closed position". Within the mold closed position, a portion of the core insert assembly 102, a portion of the cavity insert 110, a portion of the gate insert 112 and a portion of each of the split mold inserts 114 all cooperate to define the molding cavity 108.

Figure 1:
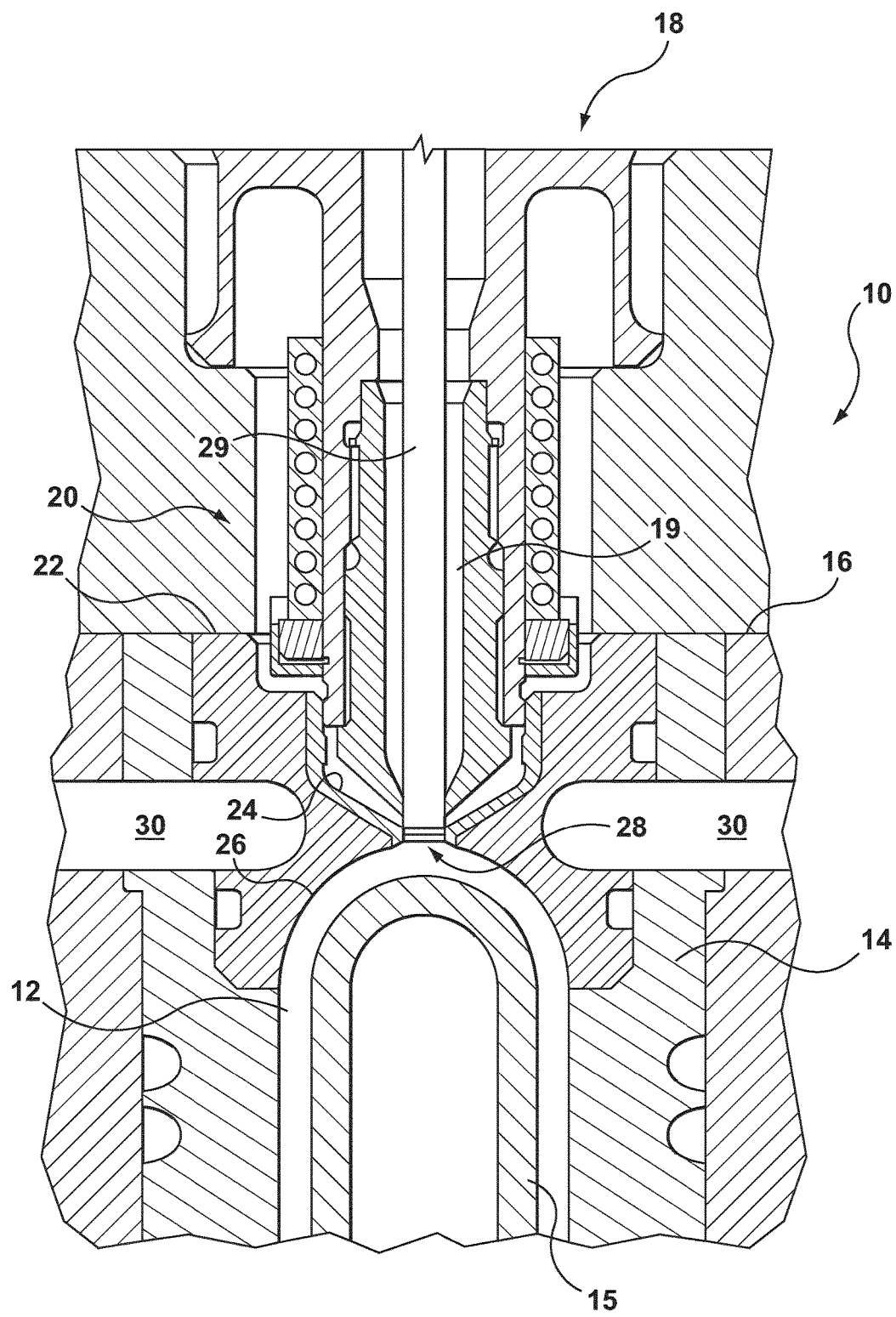
FIG. 1 shows a cross section view of a stationary portion of a prior art injection molding machine.

A shape of the molding cavity 108 corresponds to a shape of a molded article to be molded therein. Within specific non-limiting embodiment depicted in FIG. 1, the molded article to be molded comprises a preform that is capable of being subsequently blow-molded into a final-shaped article, such as beverage container. However, it should be expressly understood that the molded article can be of any other shape and/or configuration. Accordingly, it should be clear that teachings of embodiments of present invention apply to a mold stack 100 and a molding system incorporating the mold stack 100 that can be configured to produce different types of molded articles, such as, but not limited to, preforms, thin wall containers, closures and the like.

Returning to the description of the core assembly 102, in accordance with the embodiments of the present invention, the core assembly 102 comprises a core inner part member 122 attached to the core insert 106. In the specific embodiment depicted, the core inner part member 122 is attached to the core insert 106 via a threaded coupling 105. The core inner part member 122 is coupled to the core plate 104. It is noted that a specific technical effect associated with this embodiment of the present invention is ability to quick de-coupling of the core insert 106 from the core inner part member 122. Another technical effect may include ability to pre-center the core assembly 102 relative to the core plate 104. It is noted that in alternative embodiments of the present invention, the core inner part member 122 and the core insert 106 can be implemented via a different coupling therebetween or be made of a unitary structure.

There is also provided a sensor assembly 120. Generally speaking, the purpose of the sensor assembly 120 is to measure molding material pressure within the molding cavity 108, as the molding cavity 108 is being filled with the molding material during appropriate portions of the molding cycle (such as injection, holding, etc).

The sensor assembly 120 is configured to measure the pressure in a dynamic fashion—put another way, instead of doing a measurement of in-mold pressure during a certain point in the molding cycle—the core assembly 102 is configured to measure the in-mold molding material pressure during the entire length of the molding cycle. Furthermore, the core assembly 102 is configured to measure the in-mold molding material pressure using the entire "active surface" of the core insert 106 (i.e. the surface of the core insert 106 that actively participates in the molding process— i.e. forming the molded article and hence "touching" the molding material)—as contrasted to single point of measurement of the prior art solutions. The use of the active surface of the core insert 106 inevitably leads to the fact that all process parameters that the core insert 106 effectively experiences during the molding process get reflected into the measurement thus obtained by the sensor assembly 120. Generally speaking, the core assembly 102 is configured to measure the overall forces that the core assembly 102 experiences during the injection cycle. These may include forces attributable to some or all of the injection pressure, hold pressure, stem closing, molded article shrinkage onto the core assembly 102. The core assembly 102 can be further configured to measure the overall forces attributable to traction, such as but not limited to some or all of ejection force of the molded article off the core assembly 102, adherence of the molded article into the molding cavity 108 and the like.

Within the illustrated embodiment of FIG. 2, the sensor assembly 120 is sandwiched in-between the core inner part member 122 and the core insert 106. Attached to the core inner part member 122 is a load cell 124. The load cell 124 can be implemented as any transducer that is used to convert a force into electrical signal. There is also provided a load cell cover 125, configured to physically envelope a portion of the load cell 124. Generally speaking, the purpose for the load cell cover 125 is for calibrating the load cell 124 by applying a certain force (such as preload) through the screws (not depicted) of the load cell cover 125. Additionally (or alternatively), the load cell cover 125 may assist in adjusting precision of the load cell 124. For example, with the preloading of the load cell cover 124, we reduce any gaps potentially present in the sensor assembly 120 and, as such, the load cell 124 will be able to provide a more accurate reading. Additionally (or alternatively) the load cell cover 125 may assist in increasing the working range. Provision of the load cell cover 125 allows to appreciate not only the compressive force exerted onto the core 106 during injection, but also appreciate the demolding force, i.e. traction force experienced by the core during the molded article being removed from the core 106. In use, when the molding material is being injection into the molding cavity or the so-injected molding materials cools in the cavity, the sensor assembly 120 effectively measures the in-mold molding material pressure as the molding material acts upon the entire active surface of the core assembly 102.

Given the architecture described above with reference to FIG. 2 and in accordance with non-limiting embodiments of the present invention, a method of operating a molding system includes, at least during a portion of a molding cycle, (i) appreciating the in-mold pressure using the entire active surface of the core insert assembly 102 and, (ii) based on the measured in-mold pressure, adjusting at least one operational parameter of the molding system that houses the molding stack 100. It should be expressly understood that within some of the embodiments of the present invention, the in-mold pressure can be appreciated for each molding cavity. In other non-limiting embodiments, the in-mold molding material pressure can be appreciated for a sub-set of molding cavities.

According to embodiments of the present invention, it is contemplated that the adjusted parameters can include one or more of:
  Hot runner valve stem opening and closing;
  Valve stem pressure or force or speed;
  Melt temperature;
  Ejection speed.
  Naturally, other embodiments further adjusted parameters are possible.

In one example embodiment of the present invention, where it is determined that the melt pressure outside of the pre-defined thresholds, the method contemplates adjusting melt temperature, for example, by increasing or decreasing same. Generally speaking, if it is determined that the melt pressure is below the pre-determined threshold, one or more of the following remedial actions could be taken:
  In case of the molding cavity 108 experiencing a lower in-mold pressure compared to the other molding cavities within the same shot, increasing the flow of the molding material into the molding cavity 108 by opening the melt channel through the stem position of the hot runner nozzle associated with the molding cavity 108 in question
  In case of the molding cavity 108 experiencing a higher in-mold pressure compared to the other molding cavities within the same shot, decreasing the flow of the molding material into the cavity 108 by restricting the melt channel through the stem position of the hot runner nozzle associated with the remainder of the molding cavities 108 Increasing the nozzle temperature of the molding cavity 108 experiencing increased flow compared to other cavities in order to get same injection profile in time cavity to cavity
  Decreasing the nozzle temperature of the molding cavity 108 experiencing restricted flow compared to other cavities in order to get same injection profile in time cavity to cavity Even though the above examples have used adjusting (increasing or decreasing) the temperature associated with a given nozzle, it should be appreciated that in alternative embodiments of the present invention, the temperature can be adjusted (increased or decreased) at a level upstream from the nozzle, such as in a portion of a hot runner associated with the given nozzle that needs to be controlled. In yet other embodiments of the present invention, same analysis can be applied to regulating of the holding pressure.

Therefore, given the architecture given above, it is possible to execute a method of operating a molding apparatus having a plurality of molding cavities. The method comprises measuring a pressure profile for each molding cavity; comparing the pressure profiles; adjusting an operational parameter of the molding apparatus to obtain the same pressure profile within all of the molding cavities. According to various embodiments of the present invention, the melt pressure profiles for each or only some molding cavities 108 can be compared by measuring the force applied by the molten material on the core assembly 102 through the sensor assembly 120. If the curves profile (i.e. the force read on the load cell 124) are not equal (indicative of the molding pressure experienced in different molding cavities 108 being different) a remedial action can be taken. As explained, the remedial action can be balancing the flow of the molding material by regulating the nozzle stems (open, close, or partially close positions) top regulate the flow of molding material into the molding cavities 108, by regulating the temperature of a portion of a melt distribution network (also known as a hot runner) or of the hot runner nozzles to regulate the flow of the molding materials and the like.

Some of the technical effects of embodiments of the present invention may include some or all of the following. For example, ability to compare process curves from different molding cavities and to adjust the individual process profiles allows for obtaining substantially the same injection condition for molding cavities, which in turn may result in better part quality repeatability drop to drop, less weight variation drop to drop, faster cycle time and the like. It is also contemplated that manufacturing of defective parts may be avoided or, at the very least, defective parts can be detected and removed. Another technical effect of embodiments of the present invention may include improved repeatability both shot to shot and between molded articles made in different molding cavities 108. Another technical effect of embodiments of the present invention may include detecting potential issues during the molding cycle (i.e. real time) or noticing drifts in the quality of production. Yet another technical effect of embodiments of the present invention may include appreciating of the any modifications required to the texture of the core 106 based on the appreciated demolding force (for example, if the core 106 requires refurbishment (through re-texturing by using sandblasting, draw stones or the like). It should be expressly understood that not each and every advantage has to be appreciated and realized in each and every embodiment and implementation of the present invention.

Yet another technical effect of embodiments of the present invention may include appreciating of the any modifications of the resin properties due to resin condition change as drying or resin supply change as experiencing different batch of resins and IV's.

The description of the embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. A method of operating a molding apparatus having a plurality of molding cavities for forming a respective plurality of molded articles from a molding material, comprising:

measuring a pressure profile for a first molding cavity and a second molding cavity, wherein the measuring of the pressure profile for a molding cavity comprises using an entire active surface of a core assembly of the molding cavity to measure an in-mold pressure, the core assembly comprising a core inner part member for attachment to a core plate coupled to a core insert for defining an inner surface of a molded article, the active surface of the core assembly being the surface of the core insert that touches the molding material during formation of the molded article, wherein the measuring is performed by a sensor assembly sandwiched between the core insert and the core inner part member;

comparing the pressure profiles;

adjusting an operational parameter of the molding apparatus to obtain the same pressure profile within all of the molding cavities.

2. The method of claim 1, wherein the first molding cavity and the second molding cavity are part of the plurality of molding cavities of a mold and wherein the measuring comprises measuring the pressure profile of all of the molding cavities of the plurality of molding cavities.

3. The method of claim 1, wherein adjusting an operational parameter comprises increasing the flow of the molding material into the molding cavity experiencing low melt pressure by opening a stem of a hot runner nozzle associated with the molding cavity.

4. The method of claim 1, wherein adjusting an operational parameter comprises increasing the flow of the molding material into the cavity experiencing low melt pressure by closing a respective stem of a hot runner nozzle associated with each of the remainder of the molding cavities.

5. The method of claim 1, wherein adjusting an operational parameter comprises increasing the nozzle temperature of the molding cavity experiencing low melt pressure.

* * * * *